(12) United States Patent
Calev et al.

(10) Patent No.: US 9,244,706 B2
(45) Date of Patent: Jan. 26, 2016

(54) COMMAND LINE SHELL COMMAND GENERATION BASED ON SCHEMA

(75) Inventors: Joseph Calev, Bellevue, WA (US); Edwin Young, Seattle, WA (US); Nirav A. Kamdar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 861 days.

(21) Appl. No.: 12/788,482

(22) Filed: May 27, 2010

(65) Prior Publication Data

US 2011/0296373 A1 Dec. 1, 2011

(51) Int. Cl.
*G06F 9/44* (2006.01)
*G06F 9/455* (2006.01)

(52) U.S. Cl.
CPC .............. *G06F 9/45512* (2013.01); *G06F 8/38* (2013.01)

(58) Field of Classification Search
CPC ................................ G06F 9/45512; G06F 8/38
See application file for complete search history.

(56) References Cited

U.S. PATENT DOCUMENTS

| | | | |
|---|---|---|---|
| 6,950,866 B1 | 9/2005 | Lowry et al. | |
| 7,036,072 B1 * | 4/2006 | Sulistio et al. | 715/205 |
| 7,263,686 B2 | 8/2007 | Sadiq | |
| 7,650,590 B2 | 1/2010 | Bender | |
| 7,870,240 B1 * | 1/2011 | Horvitz | 709/223 |
| 8,341,514 B2 * | 12/2012 | Westerinen et al. | 715/234 |
| 2001/0054172 A1 | 12/2001 | Tuatini | |
| 2003/0120665 A1 * | 6/2003 | Fox et al. | 707/100 |
| 2003/0217128 A1 * | 11/2003 | Yanosy | 709/223 |
| 2004/0205573 A1 * | 10/2004 | Carlson et al. | 715/513 |
| 2004/0267768 A1 * | 12/2004 | Harjanto | 707/100 |
| 2005/0091346 A1 * | 4/2005 | Krishnaswami et al. | 709/220 |
| 2006/0036612 A1 * | 2/2006 | Harrop et al. | 707/100 |
| 2006/0080646 A1 * | 4/2006 | Aman | 717/143 |
| 2006/0107251 A1 * | 5/2006 | Boshier et al. | 717/108 |
| 2006/0197967 A1 * | 9/2006 | Snover et al. | 358/1.13 |
| 2007/0044042 A1 * | 2/2007 | Jones et al. | 715/961 |
| 2007/0088707 A1 * | 4/2007 | Durgin et al. | 707/10 |
| 2007/0100967 A1 * | 5/2007 | Smith et al. | 709/219 |
| 2008/0209316 A1 * | 8/2008 | Zandstra | 715/700 |
| 2008/0288917 A1 | 11/2008 | Lee et al. | |

(Continued)

FOREIGN PATENT DOCUMENTS

CN 101091160 A 12/2007

OTHER PUBLICATIONS

Cazzulino, Daniel., "Code Generation in the .NET Framework Using XML Schema", Retrieved at << http://msdn.microsoft.com/en-us/library/aa302301.aspx >>, May 2004, pp. 17.

(Continued)

*Primary Examiner* — Tarek Chbouki
(74) *Attorney, Agent, or Firm* — Andrew Smith; Jim Ross; Micky Minhas

(57) ABSTRACT

A code generator tool capable of creating command shell commands at compile time or runtime from a schema such as an XSD schema is provided. The code generator generates classes to represent data defined by a schema and the command shell generation code may use knowledge of the classes to generate appropriate command shell classes to manipulate the data. Plug-ins may be inserted following optimization of a model of classes generated by the code generation tool. The plug-ins can modify the model, insert their own code, or disable code generation and generate their own code from the model.

17 Claims, 6 Drawing Sheets

(56) References Cited

U.S. PATENT DOCUMENTS

2009/0254881 A1 10/2009 Johnson et al.
2010/0235725 A1* 9/2010 Drayton et al. ............... 715/234

OTHER PUBLICATIONS

Bittencourt, Andre L D A C., "Code Generator, Plug-in Based", Retrieved at << http://www.codeproject.com/KB/cs/CodeGenPlugin.aspx >>, Dec. 4, 2006, pp. 4.

Ranganath, et al., "Automatic Code Generation for LYE, a High-performance Caching SOAP Implementation", Retrieved at << http://research.microsoft.com/en-us/um/people/rvprasad/publications/swws06.pdf >>, Proceedings of the 2006 International Conference on Semantic Web {\&} Web Services, SWWS, Jun. 26-29, 2006, pp. 7.

"Generating an EMF 1.1 Model using XML Schema", Retrieved at << http://www.eclipse.org/modeling/emf/docs/1.x/tutorials/xlibmod/xlibmod_emf1.1.html#step2 >>, Retrieved Date: Apr. 12, 2010, pp. 19.

"XML Schema Driven Code Generator", Retrieved at << http://www.altova.com/xmlspy/xml-code-generation.html >>, Retrieved Date: Apr. 12, 2010, pp. 5.

"First Office Action and Search Report Issued in Chinese Patent Applicaton No. 20110150687.3", Mailed Date: Jul. 1, 2015, 12 Pages.

* cited by examiner

COMMAND LINE SHELL COMMAND GENERATION BASED ON SCHEMA

BACKGROUND

Command shells are regular command line interpreters that support a few basic commands within an operating system. In some cases, a separate console application may be provided, to be invoked from these shells. They may also include a scripting language (batch files), which can be used to automate various tasks. However, they are not intended to automate all facets of graphical user interface (GUI) functionality of the operating system, in part because command-line equivalents of operations exposed via the graphical interface are limited, and the scripting language is typically elementary and does not allow the creation of complex scripts.

Structured documents such as extensible markup language (XML) documents are commonly used in computing. XML schema documents or XSDs are documents written in XML schema language. XSD may be used to express a set of rules to which an XML document must conform in order to be considered valid according to that schema. However, unlike most other schema languages, the determination of a document's validity according to XSD may produce a collection of information adhering to specific data types. Command shell commands (also referred to as "cmdlets") may not be sufficient to modify data defined by XSD schemas, especially when the number of schemas is large.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a code generator tool that is able to create command shell commands or "cmdlets" at compile time from a schema such as an XSD schema. The cmdlets may also be generated at runtime. The code generator may generate classes to represent data defined by a schema and the command shell generation code may use knowledge of the classes to generate appropriate command shell classes to manipulate the data. According to other embodiments, plug-ins may be inserted following optimization of a model of classes generated by the code generation tool. The plug-ins may modify the model, insert their own code, or disable code generation and generate their own code from the model.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
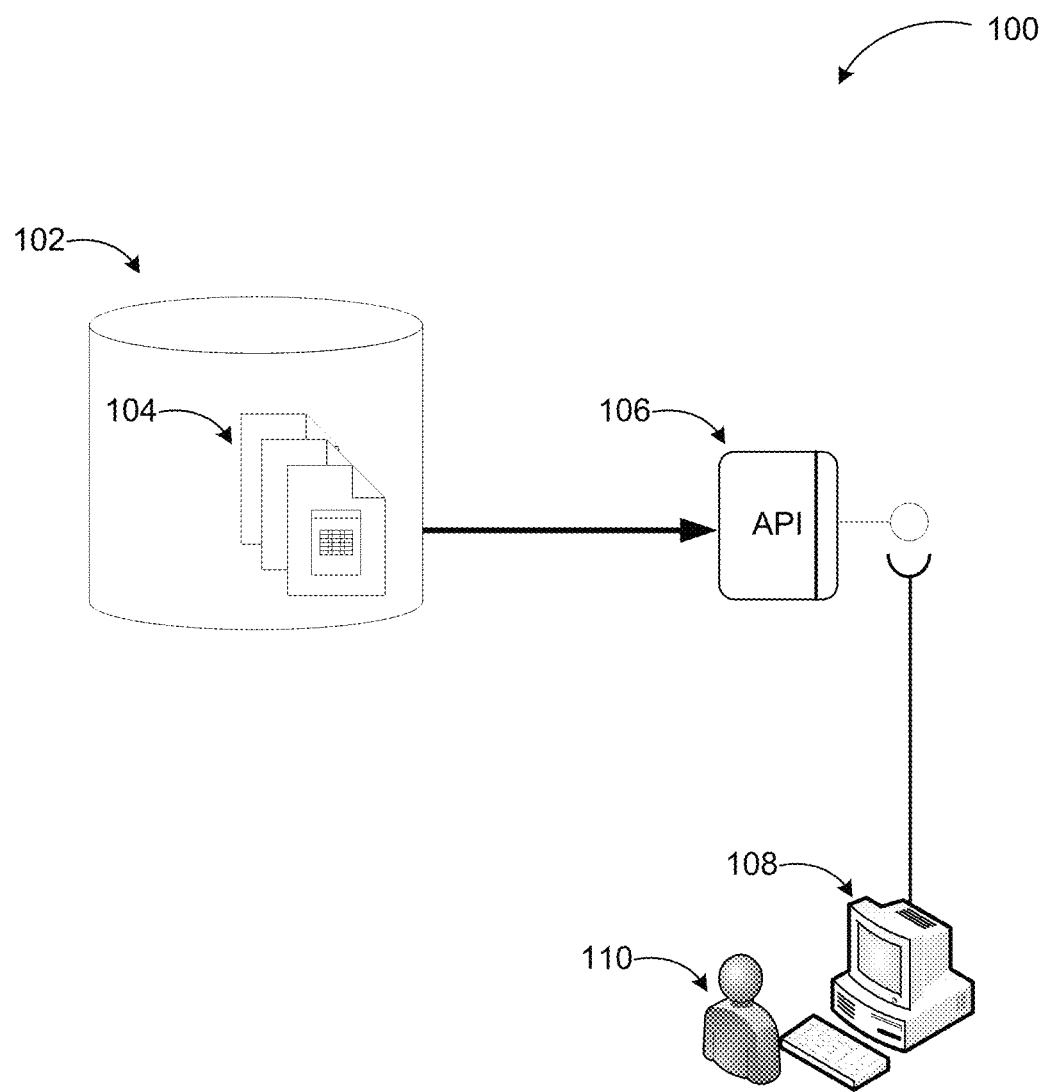
FIG. 1 is a conceptual diagram illustrating how data according to a schema may be manipulated by an administrator through application programming interfaces (APIs) in a system according to embodiments.

As briefly described above, command shell commands ("cmdlets") may be automatically generated from schemas such as XSD to enable users to manipulate data structured according to the schema. A code generator may generate classes to represent data defined by the schema and a command shell generation code may use knowledge of the classes to generate appropriate command shell classes to manipulate the data. Plug-ins referencing a common model may be used to generate any type of code without needing to parse the schemas. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing computing systems. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes conceptual diagram 100 illustrating how data according to a schema may be manipulated by an administrator through application programming interfaces (APIs) in a system according to embodiments. A schema (or schema document) is an abstract collection of metadata, consisting of a set of schema components such as element and attribute declarations, as well as complex and simple type definitions. The components may be created by processing a collection of schema documents, which may contain source language definitions of the components.

Schema documents may be organized by namespace. All named schema components belong to a target namespace, and the target namespace is a property of the schema document as a whole. A schema document may include other schema documents for the same namespace, and may import schema documents for a different namespace. When an instance of a document is validated against a schema, the schema to be used for validation may be supplied as a parameter to the validation engine, or it may be referenced directly from the instance of the document using special attributes. The schema may be used to generate human readable documentation and/or code. The code may enable contents of XML documents to be treated as objects within a programming environment.

As shown in diagram 100, data store 102 may store data in documents according to a particular schema such as XSD. XSD may be used to express a set of rules to which an XML document must conform in order to be considered 'valid' according to the schema. According to some embodiments, command shell commands or cmdlets may be used to manipulate XML documents 104 by an administrator 110 accessing the documents through API 106. The command shell may be provided as part of the operating system of the administrator's computing device 108. Cmdlets are specialized classes designed to expose a functionality via the command shell. If a command is an executable file, the command shell may launch it in a separate process. A cmdlet, on the other hand, is executed in the command shell process. Command shell may also provide an interactive command line interface, where the commands may be entered and their output displayed. Command shell may further enable the creation of aliases for cmdlets, which may be textually translated by the command shell into invocations of the original commands. Command shell may also support both named and positional parameters for commands. In executing a cmdlet, the job of binding the argument value to the parameter may be performed by command shell itself.

As mentioned previously, cmdlets are specialized commands in the command shell environment that implement specific functions. These are the native commands in the command shell stack. Cmdlets may follow a <verb>-<noun> naming pattern helping to make them self-descriptive. Cmdlets may output their results as objects, or collections of objects including arrays, and may optionally receive input in that form. Cmdlets always process objects individually, however. For collections of objects, the command shell may invoke the cmdlet on each object in the collection, in sequence.

The implementation of the cmdlet classes may refer to any API 106. The command shell may ensure that certain APIs are available, such as WriteObject( ) which is used to access command shell specific functionality, such as writing resultant objects to the pipeline. Data stores such as data store 102 may be exposed using drive letters, and hierarchies within them may be addressed as directories.

Figure 2:
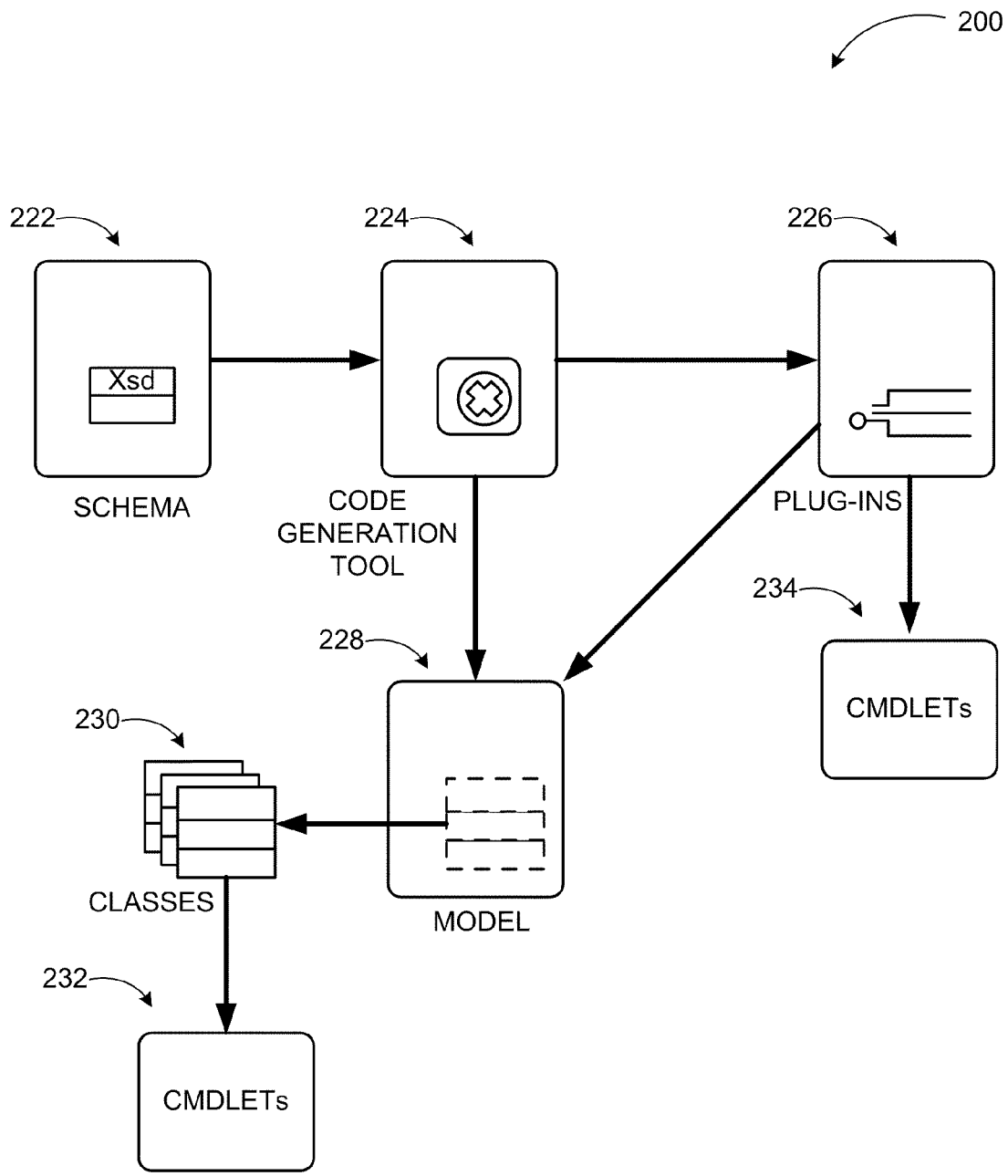
FIG. 2 is another conceptual diagram illustrating major components and interactions in a system according to embodiments.

FIG. 2 includes conceptual diagram 200 illustrating major components and interactions in a system according to embodiments. In object-oriented programming, a class is a construct that is used as a template to create objects of that class. The template describes the state and behavior that the objects of the class all share. An object of a given class is called an instance of the class. The class that contains an instance may be considered as the type of that object. A class is a model of a concept within a computer program and encapsulates the state and behavior of the concept it represents. The class encapsulates state through data placeholders called attributes and behavior through reusable sections of code called methods.

A class may also be viewed as a cohesive package that includes a particular kind of metadata. A class has both an interface and a structure. The interface describes how to interact with the class and its instances with methods, while the structure describes how the data is partitioned into attributes within an instance. A class may also have a representation at run time (metaobject), which provides run time support for manipulating the class-related metadata.

In a system according to embodiments, data may be structured according to an XSD schema 222. A code generation tool 224 may read the schema and create a model 228 of the classes 230, which are to be created by the code generation tool 224. Model 228 may contain information such as class names, properties, and data types. It may also contain information about choices and enumerations, the choices being handled by implementing an interface. Cmdlets 232 may be generated from the classes 230. Classes 230 may allow for serialization/deserialization using an XML element (Xelement) and validate constraints contained in the schema. Unique, key, and keyref constraints may be an exception to the validation. Whenever properties are updated in a generated class, the Xelement may be automatically updated. Therefore, the property values and the Xelement may be maintained synchronously.

The code generation tool 224 may also be capable of inserting plug-ins 226 following optimization of the model. The plug-ins may modify the model, insert their own code, or disable code generation and generate their own code from the model. For the classes representing the data in the data store, a plug-in may modify the model 228 and insert code to the classes. When generating the command shell cmdlets 234, the plug-in may disable the default code generation and use the model 228 to generate the cmdlets 234. The command shell cmdlets may call the data store classes internally.

Figure 3:
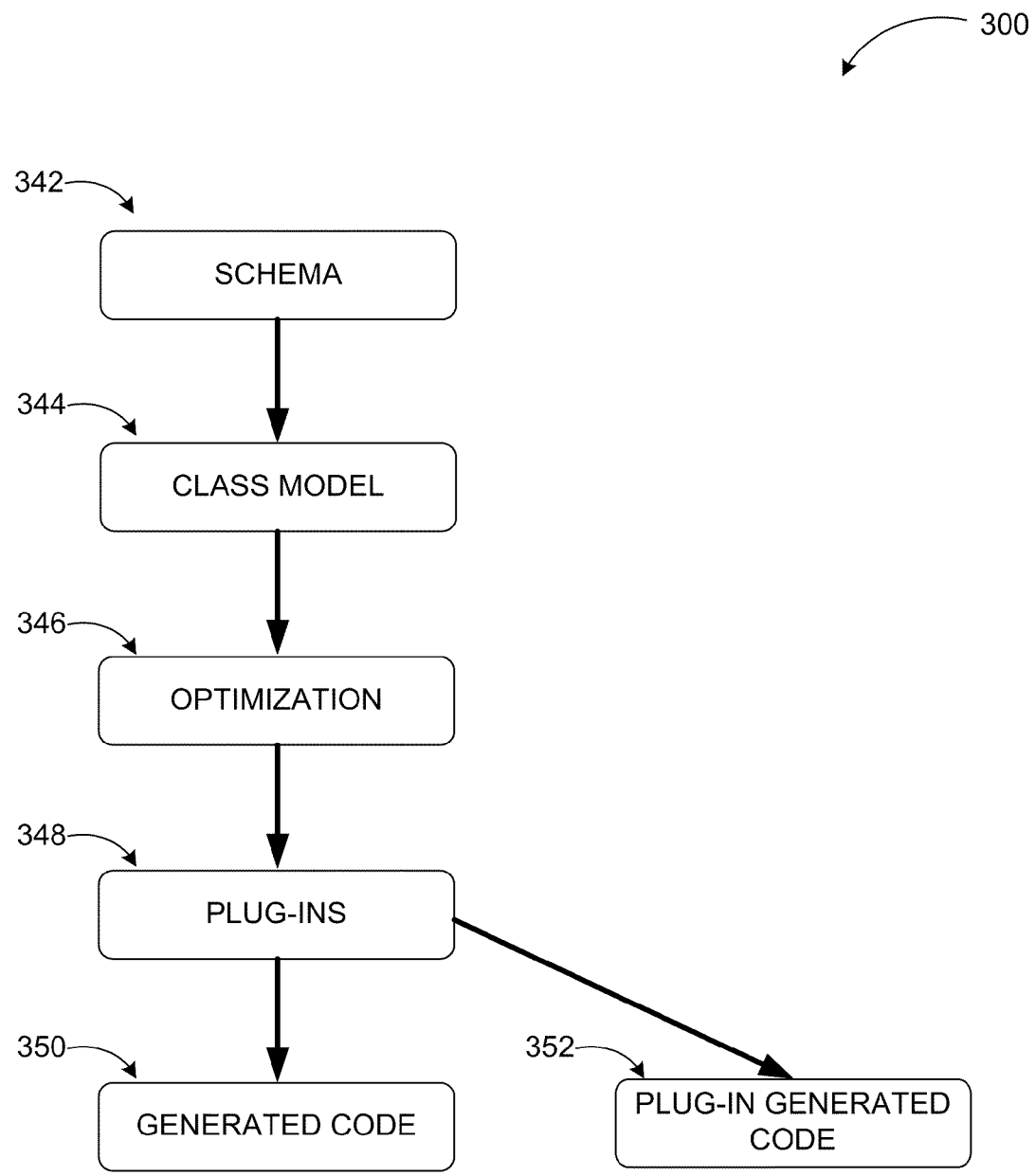
FIG. 3 is a block diagram illustrating the flow of processes in a system according to embodiments.

FIG. 3 includes block diagram 300 illustrating the flow of processes in a system according to embodiments. A code generation tool according to embodiments may also have the ability to insert plug-ins 348 after the second stage for modifying the model, inserting their own code, or disabling code generation and generating their own code 352 from the model 344. The plug-ins 348 may employ an object model that the class generator exposes to provide information about the generated classes and interfaces. Thus, the class generator itself may be product independent while the command shell plug-in(s) is (are) product dependent. This way almost any type of code may be generated from the object model enabling autogeneration of command shell cmdlets without having to parse the schemas.

The example systems in FIG. 1 through 3 have been described with specific components such as classes, models, plug-ins, and the like. Embodiments are not limited to automatic code generation for a command shell according to these example configurations. Furthermore, specific orders of operations are described for generating command shell cmdlets from XSD schemas. Embodiments are also not limited to the example orders of operations discussed above.

Figure 4:
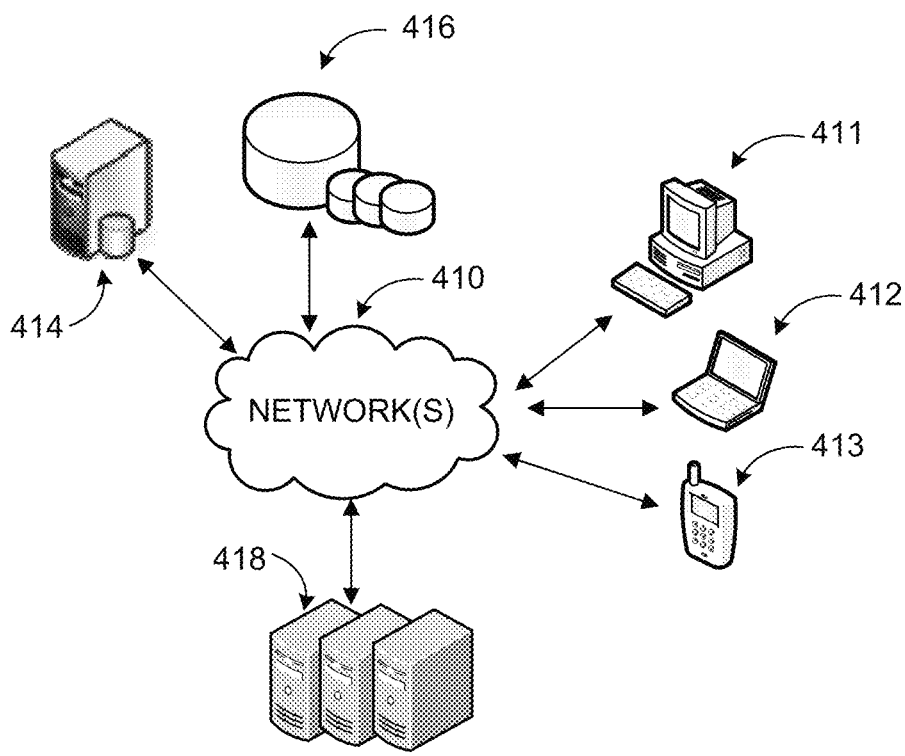
FIG. 4 is a networked environment, where a system according to embodiments may be implemented.

FIG. 4 is an example networked environment, where embodiments may be implemented. A code generation tool capable of automatically generating command shell commands from predefined schemas with the ability to use plug-ins that reference a common model to generate code without a need to parse the schema may be implemented via software executed over one or more servers 418 such as a hosted service. The system may facilitate communications between client applications on individual computing devices such as a smart phone 413, a laptop computer 412, and desktop computer 411 ('client devices') through network(s) 410.

As discussed previously, the code generator tool capable of creating command shell cmdlets at compile time or runtime from a schema such as an XSD schema may generate classes to represent data defined by the schema and the command shell generation code may use knowledge of the classes to generate appropriate command shell classes for manipulating the data. Plug-ins may be inserted following optimization of a model of classes generated by the code generation tool. The plug-ins may modify the model, insert their own code, or disable code generation and generate their own code from the model.

Client devices 411-413 may be thin clients managed by a hosted service. One or more of the servers 418 may provide a portion of operating system functionality including the code generator tool. Data such as the schemas, models, and classes may be stored in one or more data stores (e.g. data store 416), which may be managed by any one of the servers 418 or by database server 414.

Network(s) 410 may comprise any topology of servers, clients, Internet service providers, and communication media. A system according to embodiments may have a static or dynamic topology. Network(s) 410 may include a secure network such as an enterprise network, an unsecure network such as a wireless open network, or the Internet. Network(s) 410 may also coordinate communication over other networks such as PSTN or cellular networks. Network(s) 410 provides communication between the nodes described herein. By way of example, and not limitation, network(s) 410 may include wireless media such as acoustic, RF, infrared and other wireless media.

Many other configurations of computing devices, applications, data sources, and data distribution systems may be employed to implement automatic command shells command generation base on schemas. Furthermore, the networked environments discussed in FIG. 4 are for illustration purposes only. Embodiments are not limited to the example applications, modules, or processes.

Figure 5:
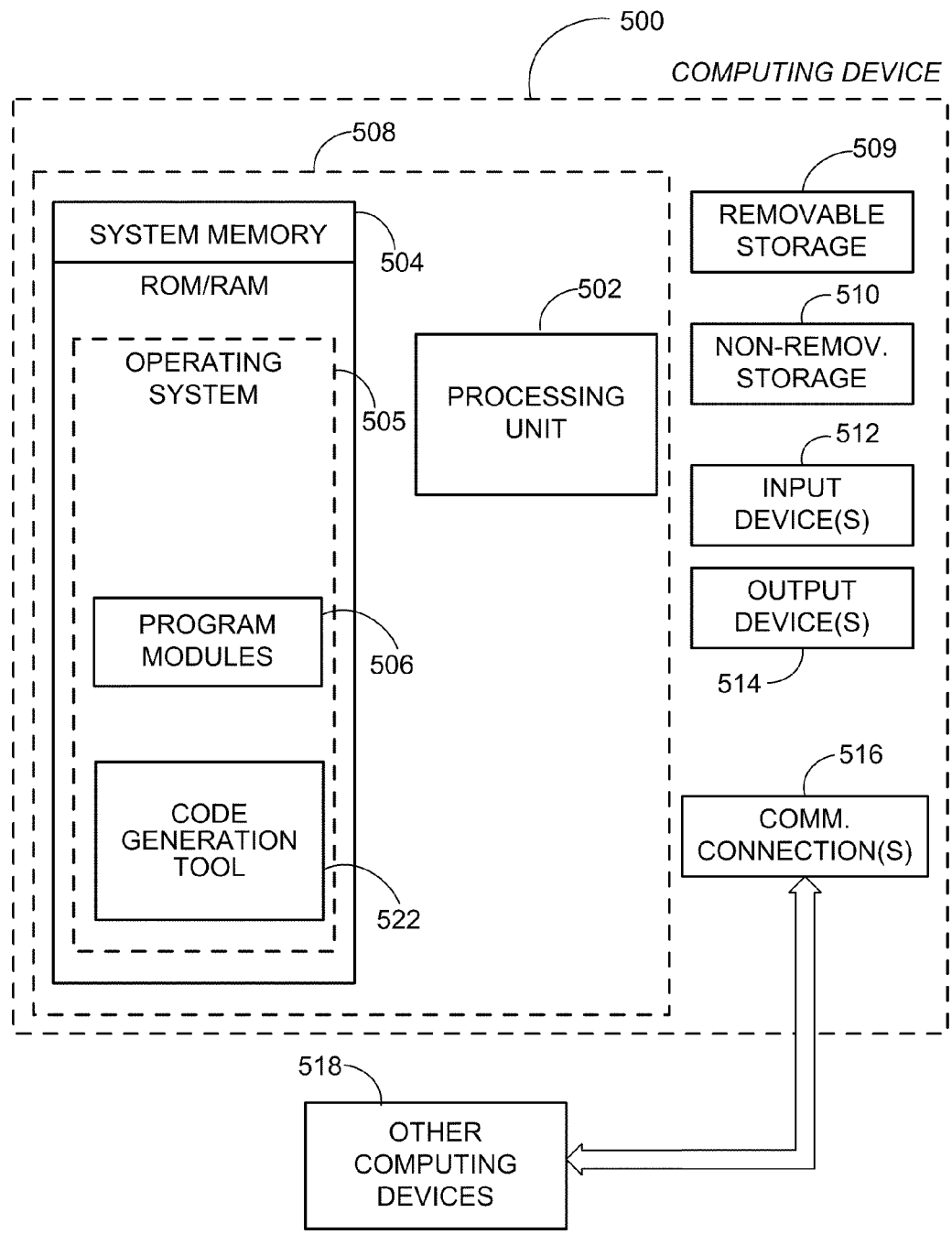
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be desktop computer and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506 and code generation tool 522.

Computing device 500 may provide a command shell within its operating system for supporting basic commands. To provide users the ability to manipulate data according to a schema such as XSD through the command shell, code generator tool 522 may automatically generate cmdlets through creating classes according to a class definition in the schema. A model generated for the classes may be optimized and plug-ins used for generating code without a need to parse the schemas. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wired or wireless network in a distributed computing environment, a satellite link, a cellular link, a short range network, and comparable mechanisms. Other devices 518 may include servers, desktop computers, handheld computers, and comparable devices. Communication connection(s) 516 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
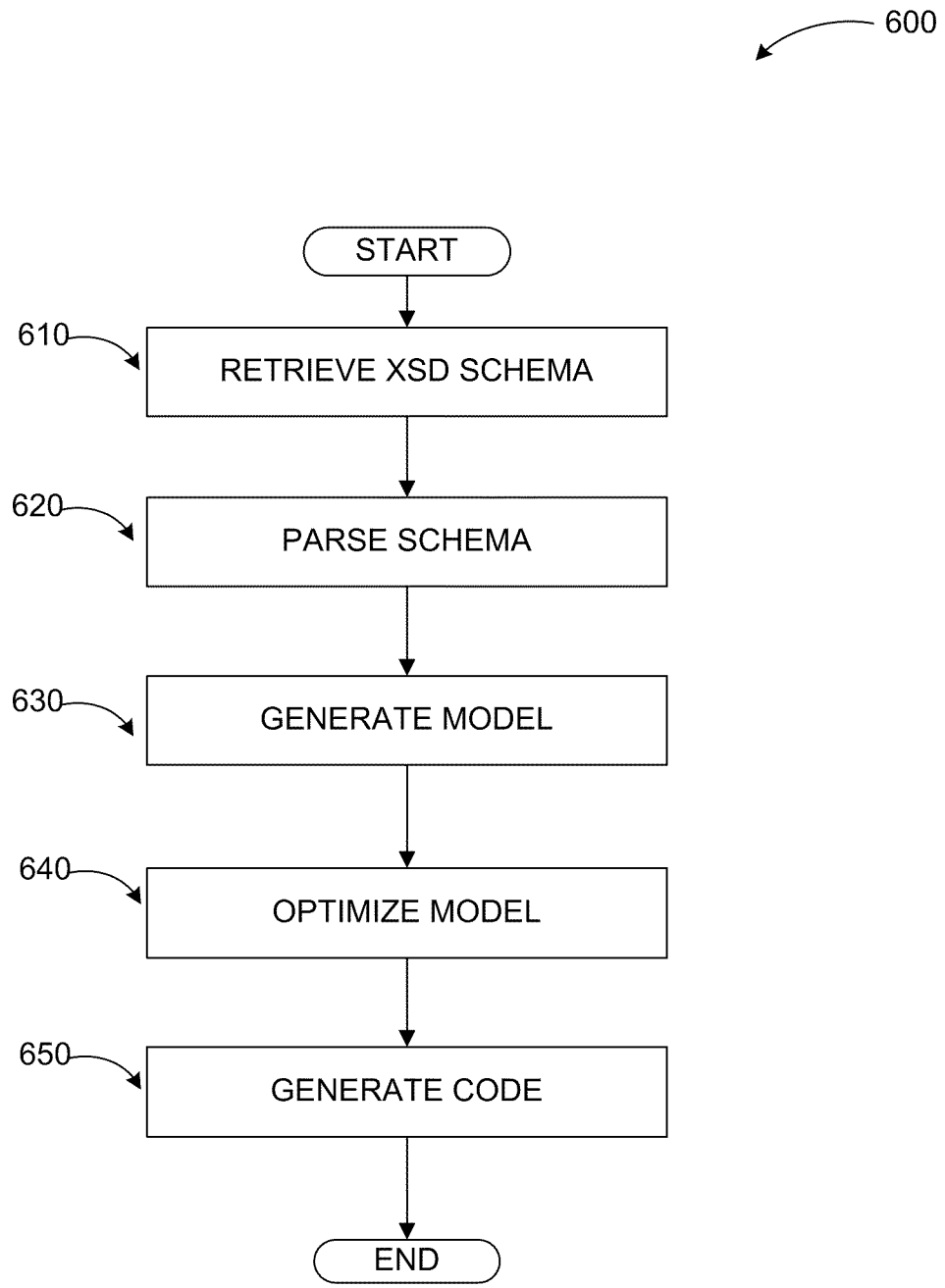
FIG. 6 illustrates a logic flow diagram for a process of auto-generating command shell commands from XSD schemas according to embodiments.

FIG. 6 illustrates a logic flow diagram for process 600 of auto-generating command shell commands from XSD schemas according to embodiments. Process 600 may be implemented as part of a command shell in an operating system.

Process 600 begins with operation 610, where an XSD schema is retrieved from a data store. While example embodiments are described using XSD for illustration purposes, embodiments are not limited to XSD, and any schema for defining structured data may be used to automatically generate command shell cmdlets for manipulating the data.

At operation 620, the schema may be parsed to generate a model of the classes to be created by the code generator tool. The model may be generated at operation 630 and include information associated with the classes. At operation 640, the model may be optimized in case the schema does not translate directly to an API. Next, the code may be generated at operation 650. The generated classes may enable serialization or deserialization and validate constraints of the schema.

The operations included in process 600 are for illustration purposes. Automatic command shell command generation based on schema(s) according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device to generate automatic command shell command code based on a schema, the method comprising:
   receiving the schema that includes one or more of: element declarations, attribute declarations, simple type definitions and complex type definitions;
   reading the schema to create a model for classes that include an interface and a structure, wherein the classes validate constraints in the schema;
   optimizing the model to translate the schema to an application programming interface (API); and
   inserting a plug-in to the optimized model to generate a command for a command shell based on the optimized model by;
      disabling generation of a default code for the command, using the plug-in; and
      generating a plug-in code for the command, using the plug-in, wherein the command manipulates data that is structured based on the classes according to a class definition in a data store associated with the schema defined by the optimized model at runtime.

2. The method of claim 1, further comprising:
   parsing the schema.

3. The method of claim 2, wherein the model includes at least one from a set of: a class name, a property, and a data type associated with the classes.

4. The method of claim 3, wherein the model further includes information associated with at least one of: choices and enumerations.

5. The method of claim 4, wherein the choices are handled by implementing the interface.

6. The method of claim 1, wherein the command is a cmdlet for the command shell.

7. The method of claim 1, wherein the plug-in modifies the model and inserts the plug-in code into the classes.

8. The method of claim 1, wherein the plug-in employs an object model exposed by a class generator to provide information about generated classes and interfaces.

9. The method of claim 8, wherein the class generator is product independent, and the plug-in is product dependent.

10. The method of claim 8, wherein the plug-in generates a command shell cmdlet without parsing the schema.

11. A computing device to generate automatic command shell command code based on a schema, the computing device comprising:
    a memory,
    a processor coupled to the memory, wherein the processor executes a code generator tool configured to:
       receive the schema that includes one or more of: element declarations, attribute declarations, simple type definitions and complex type definitions, and the schema components belonging to a target namespace;
       read the schema to create a model for classes that include an inters and a structure, wherein the classes validate constraints in the schema;
       optimize the model to translate the schema to an application programming interface (API); and
       insert a plug-in to the optimized model to generate a command for a command shell based on the optimized model, wherein the plug-in is configured to:
          disable generation of a default code for the command; and
          generate a plug-in code for the command, wherein the command manipulates data that is structured based on the classes defined by the optimized model at runtime.

12. The computing, device of claim 11, wherein the schema is an XSD schema.

13. The computing, device of claim 11, wherein the code generator tool is further configured to generate classes based on the model, and the classes provide one of a serialization and a deserialization using an Xelement.

14. The computing device of claim 13, wherein the Xelement is automatically updated in response to an update to at least one property in a corresponding class.

15. A computer-readable memory device with instructions stored thereon to generate automatic command shell cmdlet code based on a schema, the instructions comprising:
    receiving the schema that includes one or more of: element declarations, attribute declarations, simple type definitions and complex type definitions, the schema components belonging to a target namespace;
    reading the schema to create a model for classes, wherein the classes validate constraints within the schema;
    optimizing the model to translate the schema to an application programming interface (API); and
    inserting a plug-in to the model to generate a cmdlet for a command shell based on the optimized model by:
       disabling generation of a default code for the cmdlet, using the plug-in; and generating a plug-in code for the cmdlet, using the plug-in, wherein the cmdlet manipulates data that is structured based on the classes defined by the optimized model at runtime.

16. The computer-readable memory device of claim 15, wherein the instructions further comprise:

manipulating the data through the API.

17. The computer-readable memory device of claim 15, wherein the instructions further comprise:

one of: serializing and deserializing using an Xelement that is automatically updated in response to an update to at least one property in a corresponding class.

\* \* \* \* \*